US010012849B2

(12) United States Patent
Collins et al.

(10) Patent No.: US 10,012,849 B2
(45) Date of Patent: *Jul. 3, 2018

(54) MYOPIA CONTROLLING OPHTHALMIC LENSES

(71) Applicant: Johnson & Johnson Vision Care, Inc., Jacksonville, FL (US)

(72) Inventors: Michael J. Collins, Queensland (AU); Brett A. Davis, Queensland (AU); Khaled A. Chehab, Jacksonville, FL (US); Xu Cheng, St. Johns, FL (US); Daoud Robert Iskander, Wroclaw (PL)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 1009 days.

This patent is subject to a terminal disclaimer.

(21) Appl. No.: 14/307,639

(22) Filed: Jun. 18, 2014

(65) Prior Publication Data
US 2014/0320800 A1 Oct. 30, 2014
US 2017/0146821 A9 May 25, 2017

Related U.S. Application Data

(62) Division of application No. 12/821,927, filed on Jun. 23, 2010, now Pat. No. 8,789,947.

(60) Provisional application No. 61/220,487, filed on Jun. 25, 2009.

(51) Int. Cl.
G02C 7/04 (2006.01)
G02C 7/02 (2006.01)

(52) U.S. Cl.
CPC ............. G02C 7/047 (2013.01); G02C 7/024 (2013.01); G02C 7/028 (2013.01); G02C 7/04 (2013.01); G02C 2202/24 (2013.01)

(58) Field of Classification Search
CPC .... G02C 7/027; G02C 7/047; G02C 2202/24; G02C 7/024; G02C 7/028; G02C 7/04; G02C 7/041
USPC ............ 351/159.23, 159.78, 159.79, 159.73, 351/159.74; 606/5
See application file for complete search history.

(56) References Cited

U.S. PATENT DOCUMENTS

| 4,495,313 A | 1/1985 | Larsen |
| 4,680,336 A | 7/1987 | Larsen et al. |
| 4,889,664 A | 12/1989 | Kindt-Larsen et al. |
| 4,952,045 A | 8/1990 | Stoyan et al. |
| 5,039,459 A | 8/1991 | Kindt-Larsen et al. |
| 5,057,578 A | 10/1991 | Spinelli |

(Continued)

FOREIGN PATENT DOCUMENTS

| EP | 1008890 A1 | 6/2000 |
| EP | 2098192 A1 | 9/2009 |

(Continued)

OTHER PUBLICATIONS

International Search Report for Application No. PCT/US2010/039650 dated Aug. 17, 2010.

(Continued)

Primary Examiner — Jordan Schwartz

(57) ABSTRACT

Lenses are designed using the corneal topography or wavefront measurements of the eye derived by subtracting the optical power of the eye after orthokeratology treatment from the optical power before orthokeratology treatment.

15 Claims, 6 Drawing Sheets

(56) References Cited

U.S. PATENT DOCUMENTS

| | | |
|---|---|---|
| 5,314,960 A | 5/1994 | Spinelli et al. |
| 5,371,147 A | 12/1994 | Spinelli et al. |
| 5,540,410 A | 7/1996 | Lust et al. |
| 5,788,957 A * | 8/1998 | Harris .................. A61F 9/0017 424/423 |
| 6,045,578 A | 4/2000 | Collins et al. |
| 6,260,966 B1 | 7/2001 | Sawano et al. |
| 6,474,814 B1 * | 11/2002 | Griffin .................. G02C 7/028 351/159.41 |
| 7,025,460 B2 | 4/2006 | Smitth et al. |
| 7,862,171 B2 | 1/2011 | Varnas et al. |
| 8,789,947 B2 * | 7/2014 | Collins .................. G02C 7/04 351/159.74 |
| 2003/0058404 A1 | 3/2003 | Thorn et al. |
| 2005/0068490 A1 | 3/2005 | Mandell et al. |
| 2006/0132707 A1 * | 6/2006 | Tung .................. A61F 9/0017 351/159.23 |
| 2006/0250575 A1 | 11/2006 | Perel et al. |
| 2008/0291393 A1 | 11/2008 | Menezes |
| 2008/0309882 A1 | 12/2008 | Thorn et al. |
| 2010/0039620 A1 | 2/2010 | Legerton et al. |

FOREIGN PATENT DOCUMENTS

| | | |
|---|---|---|
| WO | WO 02/32297 A2 | 4/2002 |
| WO | WO 02/46805 A2 | 6/2002 |
| WO | WO 04/010205 A1 | 1/2004 |
| WO | WO 06/086839 A1 | 8/2006 |
| WO | WO 07/146673 A2 | 12/2007 |
| WO | WO 08/014544 A1 | 2/2008 |
| WO | WO 08/045847 A2 | 4/2008 |
| WO | WO 08/144497 A1 | 11/2008 |

OTHER PUBLICATIONS

Reasons for Refusal from the Japanese Patent office for Application No. 2012-517684 dated Feb. 13, 2014.

Mathur, A., et al., "Effect of Orthokeratology on Peripheral Aberrations of the Eye", Optometry and Vision Sciences, vol. 86, No. 5, May 2009, pp. E476-E484.

Iskander, D., et al., "Objective Refraction from Monochromatic Wavefront Aberrations via Zernike Power Polynomials", Ophthal. Physiol. Opt. vol. 27, 2007, pp. 245-255.

* cited by examiner

MYOPIA CONTROLLING OPHTHALMIC LENSES

CROSS-REFERENCE TO RELATED APPLICATION

This application is a divisional of application Ser. No. 12/821,927, filed Jun. 23, 2010 which claims the benefit of Provisional Application No. 61/220,487 filed Jun. 25, 2009.

BACKGROUND OF THE INVENTION

This invention relates to designs and methods for preventing, stopping or slowing myopia progression.

Myopia, also known as short-sightedness, is a refractive condition wherein the overall power of the eye is too high, or too strong, causing light from distant objects to focus in front of the retina. This is perceived by the viewer as blurring of distant objects, with the amount of blurring being related to the severity of the myopia. This condition is often first seen in childhood, and usually noticed at school age. A progression, or increase, in the severity of myopia, is usually seen in myopic cases until young adulthood.

U.S. Pat. No. 6,045,578 proposes methods of using on-axis longitudinal spherical aberration (LSA) in contact lens designs to attempt to halt myopia progression. The design approach suggested does not appear to address specific wavefront/refractive power characteristics of the individual eye/or group average data or changes in pupil size associated with close work.

U.S. Pat. No. 7,025,460 proposes methods of altering field curvature (off-axis focal point variation) to try to halt myopia progression. The mathematics behind this approach uses "extended conics" where the simple conic equations have even ordered polynomial terms added to them. These conic and polynomial terms are processed so that the contact lens surface shape of the proposed design produces the required amount of field curvature.

US 2003/0058404 and US 2008/0309882 proposes a method of measuring the wavefront of the eye and correcting the wavefront of the eye with a customized correction to slow myopia progression. Pupil size changes associated with near tasks were not an aspect of the design process.

EP 1853961 proposes the measurement of the wavefront before and after near work. The changes in wavefront aberrations are then corrected with a custom contact lens. Group or population data to create a design to control eye growth are not included.

"*Orthokeratology Alters Aberrations of The Eye*", Optometry and Vision Science, May 2009. The article discusses higher order aberrations of the eye associated with orthokeratology.

A more complete approach to slowing or stopping myopia progression is still desired. This is addressed in this specification.

SUMMARY OF THE INVENTION

In one aspect of the invention a method and resulting design to be used in the fabrication of ophthalmic lenses useful in controlling and slowing the progression of myopia incorporates the use of corneal topographic data from the eye. Ophthalmic lenses include, for example, contact lenses, intraocular lenses, corneal inlays, and corneal onlays.

In another aspect of the invention the method and resulting designs to be used in the fabrication of ophthalmic lenses useful in controlling and slowing the progression of myopia incorporates the use of wavefront data from the eye.

In yet another aspect of the invention, a design for an ophthalmic lens produced according to the methods of the invention includes a convex surface with a central optic zone surrounded by a peripheral zone which is further surrounded by an edge zone, and a concave surface which rests on the wearer's eye; the central optic zone containing an inner disc, and a plurality of annuli; and a lens power at any location in the optical zone is described by subtracting the optical power of the eye after orthokeratology treatment from the optical power before orthokeratology treatment; the lenses made using these designs are useful in controlling or slowing the progression of myopia.

In another aspect of the invention, a method to generate an ophthalmic lens design includes the steps of acquiring corneal topographic data before and after orthokeratology treatment, converting the corneal topographic data to radial power maps, subtracting the post from the pre treatment map and generating a lens power profile.

In another aspect of the invention, a method to generate an ophthalmic lens design includes the steps of acquiring wavefront data before and after orthokeratology treatment, converting the wavefront data to refractive power maps, subtracting the post from the pre treatment map and generating a lens power profile.

In yet another aspect of the invention, data for the total population is considered.

In yet another aspect of the invention, data for a subpopulation is considered.

In yet another aspect of the invention, data for an individual subject is considered.

In yet another aspect of the invention, data is an averaged over multiple files.

In yet another aspect of the invention, the lens design power profile is calculated by averaging all meridians to a rotationally symmetric form.

In yet another aspect of the invention, the lens design power profile is calculated by averaging individual meridians to a non-rotationally symmetric form.

In yet another aspect of the invention, methods of designing lenses for slowing myopia progression are encoded into instructions such as machine instructions and are programmed into a computer.

In yet another aspect of the invention, articles include executable instructions for designing lenses for slowing myopia progression; the method includes converting corneal topographic data characterizing an eye to a radial power map, generating a lens power profile and using the power profile to produce a lens design for a lens with a convex surface with a central optic zone surrounded by a peripheral zone which is further surrounded by an edge zone, and a concave surface which rests on the wearer's eye; the central optic zone containing an inner disc, and a plurality of annuli; the lens power at any location in the optical zone is described by subtracting the optical power of the eye after orthokeratology treatment from the optical power before orthokeratology treatment.

In yet another aspect of the invention, articles include executable instructions for designing lenses for slowing myopia progression; the method includes converting wavefront data characterizing an eye to a refractive power map, generating a lens power profile and using the power profile to produce a lens design for a lens with a convex surface with a central optic zone surrounded by a peripheral zone which is further surrounded by an edge zone, and a concave surface which rests on the wearer's eye; the central optic zone containing an inner disc, and a plurality of annuli; the lens power at any location in the optical zone is described by subtracting the optical power of the eye after orthokeratology treatment from the optical power before orthokeratology treatment.

DETAILED DESCRIPTION

Orthokeratology (sometimes called corneal refractive therapy) is the practice of fitting rigid contact lenses to deliberately alter the shape of the central cornea. By making the central cornea flatter in curvature, the optical power of the cornea (and therefore total eye) decreases. This has the effect of reducing the degree of myopia of the eye. Specially designed rigid contact lenses are typically worn overnight (during sleep) and removed in the morning. The pressure exerted by the rigid lens on the cornea during sleep, temporarily flattens the central cornea. This flattening leads to a reduction of myopia which gradually regresses (i.e. the cornea returns to its normal shape) over the next 1 to 3 days. The orthokeratology patient wears the rigid lens during sleep every 1 to 3 nights, depending upon the rate of regression and thereby maintains a reduced level of myopia during the waking hours (without the need to wear any form of contact lenses or spectacles).

An unintended consequence of orthokeratology has been the reduction of the rate of myopia progression in patients using this form of myopia correction. Studies by Cho et al (LORIC study) and Walline et al (CRAYON study) have both shown that patients wearing orthokeratology lenses not only have a reduction in myopia, but a reduction in the rate of myopia progression (i.e. eye growth). A likely explanation for this reduction in the rate of myopia progression is the optical changes induced in the cornea by orthokeratology. In effect, orthokeratology changes the corneal optics so that the central refractive power is more minus (less positive), while the peripheral corneal power is more positive (less minus).

In a preferred embodiment, the methods of the invention involve using corneal topography data to design and produce contact lenses useful for treating, slowing, and sometimes stopping the progression of myopia. Corneal topography data is collected from a patient using a videokeratoscope such as a Keratron or Keratron Scout (Optikon 2000; Rome, Italy). This topographic data is available in several formats. The preferred format in the present invention is to depict the cornea as a refractive power data.

Figure 1:
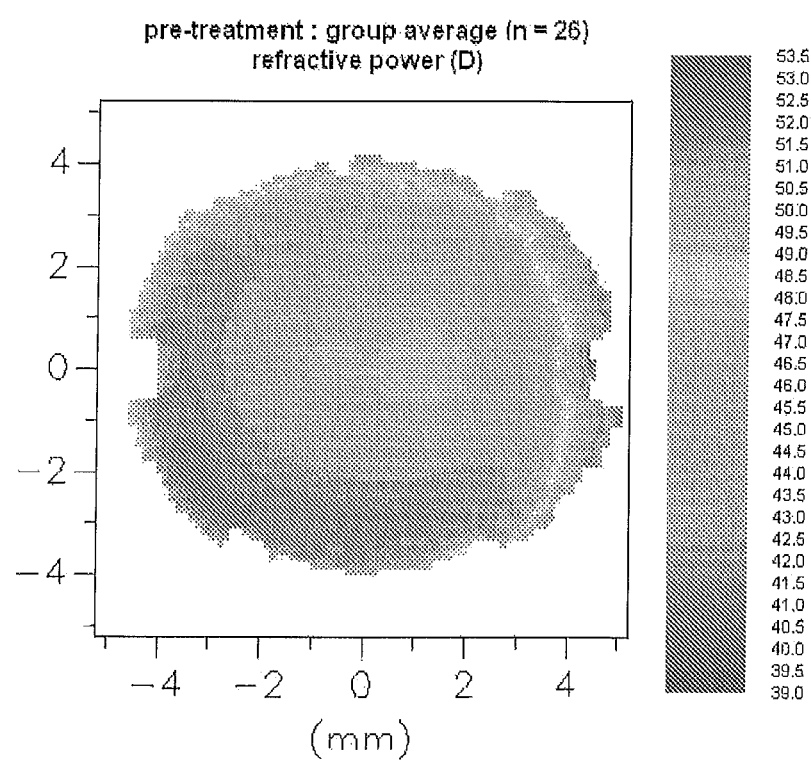
FIG. 1 shows the averaged pre treatment corneal topography maps of a group of 26 subjects prior to orthokeratology.
Figure 2:
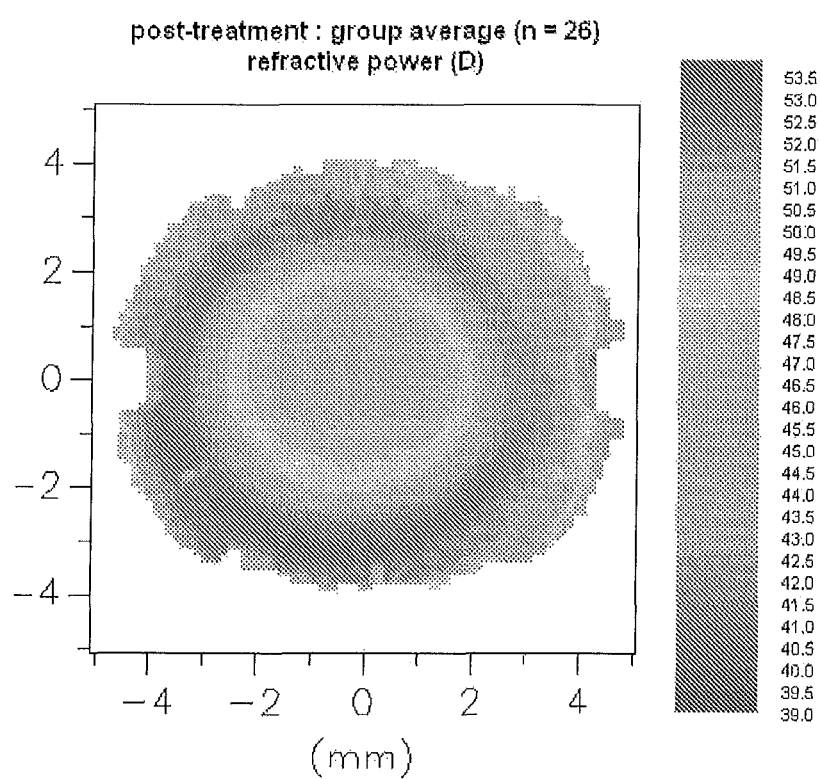
FIG. 2 shows the averaged post treatment corneal topography maps of a group of 26 subjects subsequent to orthokeratology.
Figure 3:
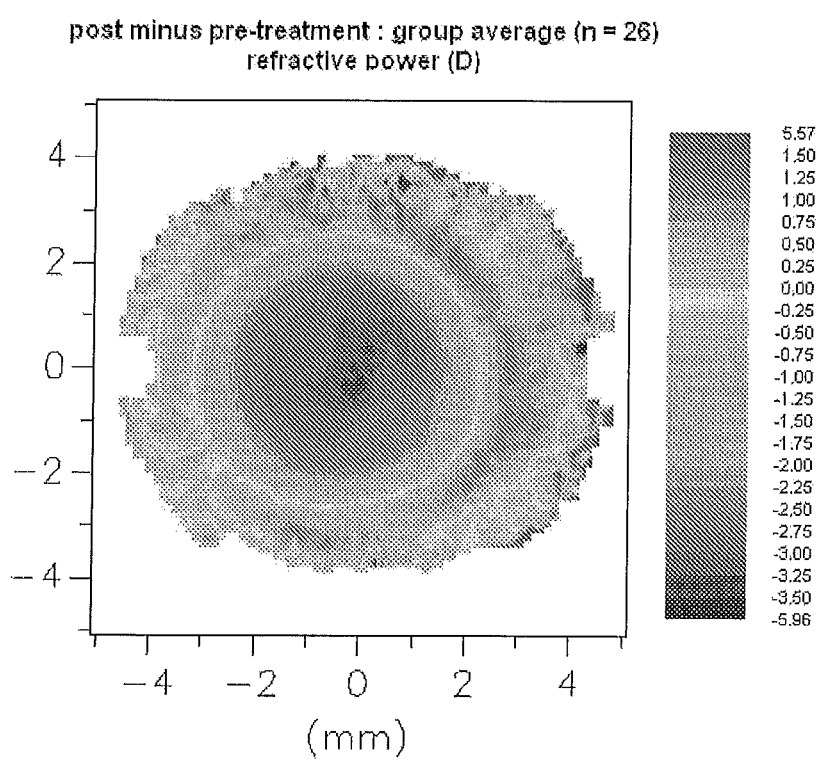
FIG. 3 shows the difference between the averaged post and pre treatment corneal topography maps of a group of 26 subjects having undergone orthokeratology treatment.

FIG. 1 shows the average corneal refractive power of 26 eyes prior to orthokeratology as measured by a videokeratoscope, and FIG. 2 shows a videokeratoscope image of the same 26 eyes after treatment by orthokeratology. The change in corneal power is derived by subtracting the refractive power of the cornea before and after orthokeratology. This map of refractive power change shows the central shift of power in the minus direction (i.e. blue colors) and the peripheral shift in powers in the positive direction (i.e. red colors), and is shown in FIG. 3. The difference map is the basis for the design power profile reported herein, and will control the rate of myopia progression.

In one embodiment, these maps are centered around the videokeratoscope axis (the axis at which the videokeratoscope measures the corneal shape), however in a preferred embodiment they could also be resampled and centered around the pupil of the eye (i.e. the entrance pupil of the eye at the corneal plane). The pupil center and videokeratoscope axis rarely coincide. In terms of optical design, it is preferable to center the optical design along the axis of the entrance pupil center.

Figure 4:
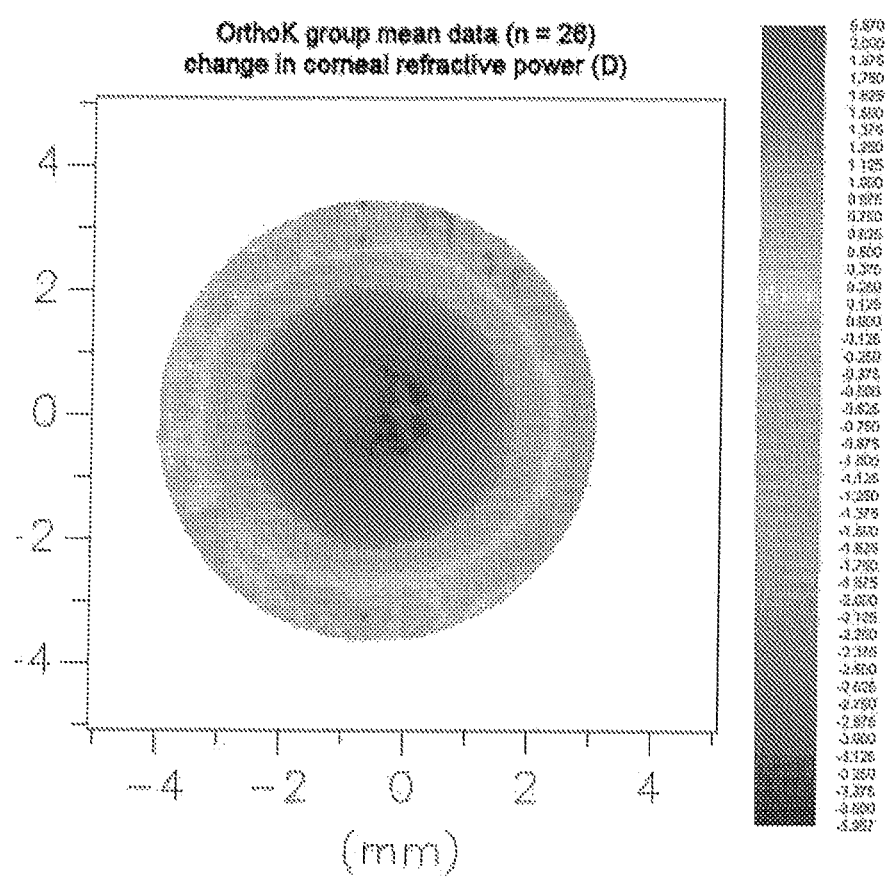
FIG. 4 shows the difference between the averaged post and pre treatment corneal topography maps of a group of 26 subjects having undergone orthokeratology treatment, truncated to a diameter of 6 mm.

The next step in the process of deriving the soft lens optical design is to reduce the two-dimensional refractive power difference map into an average power change of all of the meridians averaged together, resulting in a symmetric average power map. FIG. 4 illustrates this process for a two dimensional refractive power difference map, limited to a diameter of 6 mm.

In an alternate embodiment, the power difference map is reduced to a two-dimensional refractive power difference map by averaging the power change of each of the meridians, the individual meridians being averaged separately, resulting in a non-rotationally symmetric average power map.

In a preferred embodiment, it is desirable to extend the design power profile beyond the 6 mm limitation out to 8 mm, and to create a power profile which provides for a better clinical outcome and helps to prevent providing excessive amounts of plus optical power to the wearer. In a preferred embodiment, the plus optical power is first decreased and then leveled off.

In a preferred embodiment, a design for an ophthalmic lens produced according to the methods of the invention includes a convex surface with a central optic zone surrounded by a peripheral zone which is further surrounded by an edge zone, and a concave surface which rests on the wearer's eye; the central optic zone containing an inner disc, and a plurality of annuli; and a lens power at any location in the optical zone is described by subtracting the optical power of the eye after orthokeratology treatment from the optical power before orthokeratology treatment; the lenses made using these designs are useful in controlling or slowing the progression of myopia.

Figure 5:
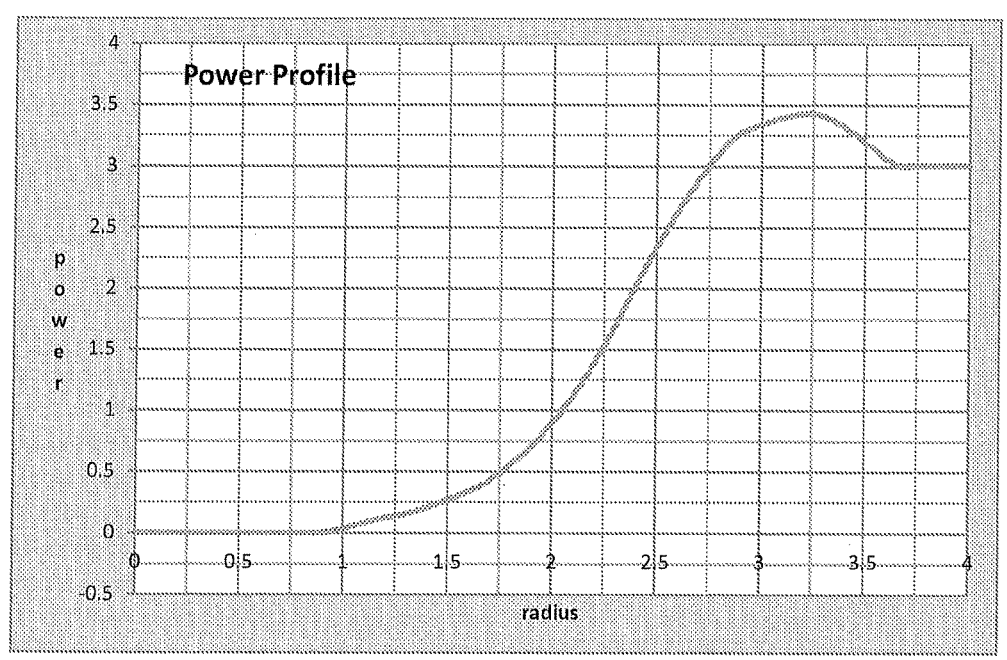
FIG. 5 shows the power profile of a lens design, according to the invention.

FIG. 5 shows the power profile of a preferred embodiment. In this preferred embodiment, the central optic zone contains an inner disc, with the range of usable diameter between 0 and 2 mm, the preferred diameter about 1.5 mm; a first annulus with an outer diameter between 6.0 to 7.0 mm, the preferred diameter about 6.5 mm; a second annulus surrounding the first annulus with an outer diameter between 7.25 and 7.75 mm, the preferred diameter about 7.5 mm; and a third annulus surrounding the second annulus, with a diameter between 7.5 and 8.5 mm, the preferred diameter being 8 mm.

The optical power shown in FIG. 5 is based upon the reduction of data for a population mean. The powers shown would be added to the initial distance prescription of the wearer. The optical power in the central disc of the optic zone is substantially constant; the optical power in the first annulus, at a diameter of 4 mm increases in plus power to a range of +0.5 to +1.5 diopters, with a preferred value of about +1.0 diopter, at a diameter of 6.5 mm has increased in plus value to a range of +1.5 to +5.5 D, with a preferred value of about +3.4 D; the optical power in the second annulus decreasing smoothly from the power found at the edge of the first annulus to a power between about +1.5 and +4.5 D, with a preferred value of about +3.0 D; the optical power of the third annulus being substantially constant at about the power found at the edge of the second annulus.

Figure 6:
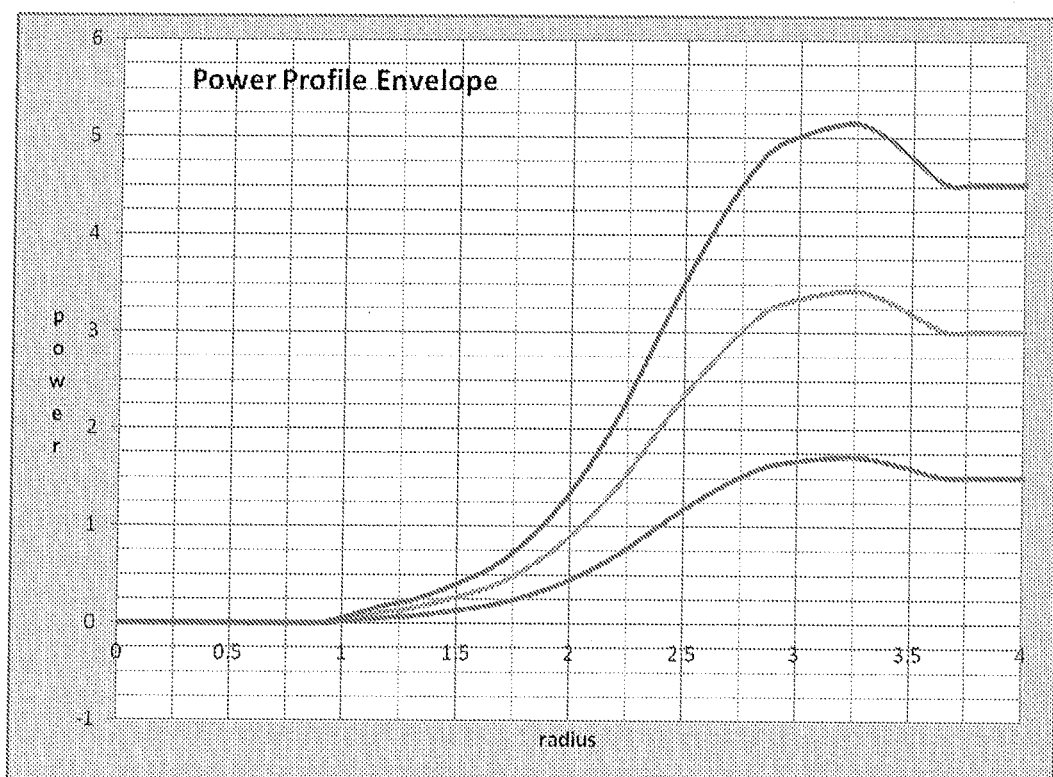
FIG. 6 shows the envelope of design profiles based upon scaling of the averages all of the meridians in the example above, according to the invention.

Distance refractive prescription powers that are substantially different than −3.00 D may require scaling of the power profile. FIG. 6 shows a preferred embodiment of a scaled envelope of resultant refractive power curves that can be calculated and applied to a lens design from the averaged data shown above. It is thus advantageous with this inventive design to create a family of design power profiles. These are created by proportionally multiplying a scaling factor for each point in the aperture; the range of the scaling factor between 0.25 and 4, 0.5 to 1.5 being the preferred range.

The preferred process steps for generating a lens design power profile by this method are as follows:
1) Acquire and average corneal topography refractive power data maps for eyes pre orthokeratology treatment,
2) Acquire and average corneal refractive power data maps for eyes post orthokeratology treatment,
3) Subtract the pre treatment from the post treatment maps,
4) Average all of the meridians together to generate a rotationally symmetric power map.
5) Alternately average the individual meridians together to generate a non-rotationally symmetric power map.
6) Trim the maps to a convenient uniform diameter,
7) Optionally extend the profile out to a larger diameter by decreasing the plus optical power and then flat leveling the power.
8) Optionally generate an envelope of average resultant power profiles by proportional scaling.

In an alternate embodiment, the methods of the invention involve using wavefront data to design and produce contact lenses useful for treating, slowing, and sometimes stopping the progression of myopia. Ocular wavefront data is collected from a patient using a wavefront sensor such as a COAS (wavefront Sciences Inc, Albuquerque N. Mex.). This wavefront data is generally in the form of Zernike polynomial coefficients but can also be a set of wavefront heights at specified Cartesian or polar coordinates. A preferred system to designate the Zernike coefficients has been described as the OSA method, in ANSI Z80.28.

The preferred process steps for generating a lens design power profile by this method are as follows:
1) Acquire and average ocular wavefront data maps for eyes prior to orthokeratology treatment. Each wavefront is converted to a refractive power map by calculating the powers based upon the radial slopes in the direction of the z axis, defined as the front to back axis, e.g. along the visual axis through the pupil center.
2) Acquire and average ocular wavefront data maps for eyes post orthokeratology treatment. Each wavefront is converted to a refractive power map by estimating the radial slopes in the direction of the z axis, defined as the front to back axis, e.g. along the visual axis through the pupil center.
3) Subtract the pre treatment from the post treatment maps.
4) Average all of the meridians together to generate a rotationally symmetric power map.
5) Alternately average the individual meridians together to generate a non-rotationally symmetric power map.
6) Trim the maps to a convenient diameter
7) Optionally extend the profile out to a larger diameter by decreasing the optical power and then flat leveling the power.
8) Optionally generate an envelope of average resultant power profiles by proportional scaling.

In this method, a refractive power map is calculated from the set of estimated wavefront Zernike coefficients using the refractive Zernike power polynomials, $\Psi_j(\rho,\theta)$, as follows (see Iskander et al., 2007, attached)

$$\hat{F}(r, \theta) = \frac{10^3}{r_{max}} \sum_{j=3}^{P-1} c_j \Psi_j(r/r_{max}, \theta) \quad (1)$$

where $c_j$ are the wavefront Zernike polynomial coefficients, $r_{max}$ corresponds to the pupil radius, $$\Psi_j(\rho, \theta) = \begin{cases} \sqrt{2(n+1)}\, Q_n^m(\rho)\cos(m\theta), & m > 0 \\ \sqrt{2(n+1)}\, Q_n^m(\rho)\sin(m\theta), & m < 0 \\ \sqrt{n+1}\, Q_n^m(\rho) & m = 0 \end{cases} \quad (2)$$

with $$Q_n^m(\rho) = \sum_{s=0}^{(n-|m|)/2-q} \frac{(-1)^s (n-s)!(n-2s)}{s!((n+|m|)/2-s)!((n-|m|)/2-s)!} \rho^{n-2s-2} \quad (3)$$

and $$q = \begin{cases} 1, & |m| \le 1 \\ 0, & \text{otherwise} \end{cases}.$$

Other methods are known by those skilled in the art to generate or calculate refractive power values from wavefront data. Ocular pupil sizes are also estimated either directly from the wavefront measurement or by an independent pupil measurement (e.g. using a pupillometer). If the pupil is measured independently of the wavefront, it should be measured under similar lighting conditions.

The method can be used to design lenses for individuals on a custom lens basis or averaged for populations, or sub-populations. This method can be used to produce a rotationally symmetric design where all optic zone meridians are the same, or a non-rotationally symmetric design where each meridian is unique and the result of the analysis of comparing topography or wavefront before and after orthokeratology.

The ophthalmic lens made according to the invention has the following parts and characteristics:
a) a convex surface with a central optic zone surrounded by a peripheral zone which is further surrounded by an edge zone, and a concave surface which rests on the patient's eye;
b) the lens power at any location in the optical zone is described by subtracting the optical power of the eye after orthokeratology treatment from the optical power before orthokeratology treatment.

In another preferred embodiment, the ophthalmic lens made according to the invention has the following parts and characteristics:
a) A central optic zone, the central optic zone contains an inner disc, with the range of usable diameter between 0 and 2 mm, the preferred diameter about 1.5 mm;
b) a first annulus with an outer diameter between 6.0 to 7.0 mm, the preferred diameter about 6.5 mm;
c) a second annulus surrounding the first annulus with an outer diameter between 7.25 and 7.75 mm, the preferred diameter about 7.5 mm;
d) a third annulus surrounding the second annulus, with a diameter between 7.5 and 8.5 mm, the preferred diameter being about 8.0 mm.

In another preferred aspect of the present invention, the ophthalmic lens made according to the invention has the following parts and characteristics:
a) The optical power in the central disc of the optic zone is substantially constant;
b) the optical power in the first annulus at about a diameter of 4 mm increases in plus power to a range of +0.5 to +1.5 D, with a preferred value of about +1.0 D, at a diameter of 6.5 mm increases in plus power to a range +1.5 to +5.5 D, with a preferred value of about +3.4 D;
c) the optical power in the second annulus decreasing smoothly from the power found at the edge of the first annulus to a power between +1.5 and +4.5 D, with a preferred value of about +3.0 D;
d) the optical power of the third annulus being substantially constant at about the power found at the edge of the second annulus.

In another preferred aspect of the present invention, the ophthalmic lens made according to the invention has the following parts and characteristics:
a) The optical power in the central disc of the optic zone is substantially constant;
b) the optical power in the first annulus increases in plus power by a suitable polynomial equation of $4^{th}$ order or higher;
in a preferred aspect, the power change in the first annulus is governed by the equation:

$$Power=0.486x^6-5.8447x^5+27.568x^4-65.028x^3+81.52x^2-51.447x+12.773$$

where x is the radial distance from the center of the lens.
c) the optical power in the second annulus decreasing from the power found at the edge of the first annulus to a power between +1.5 and +4.5 D, with a preferred value of about +3.0 D;
d) the optical power of the third annulus being substantially constant at about the power found at the edge of the second annulus.

It is recognized by those skilled in the art that the power in the central optical zone of the lens is a result of the powers of the back surface and front surface working together. The variations in power described by the method and design of the present invention may be applied to the front surface, back surface, or any combination thereof. In a preferred embodiment, the power variations described by the method and design of the present invention are applied to the front surface.

Power Profile Driven Ophthalmic Lens Design Methods:
Different data sources can be used to derive a contact lens design for myopia control. Examples include:

A customized design based on the individual subjects data, or
A group design based on a particular sub-population of data (e.g. young Asian children aged 10-16 years of age), or
A general population design based on all available data (e.g. all myopes).

Additionally, both rotationally symmetric designs or non-rotationally symmetric designs are obtainable using the method of the invention. When data is averaged across all considered semi-meridians or it can be used to create rotationally symmetrical designs, or if the data is retained in its semi-meridional form it can be used to create non-rotationally symmetric designs. Non-rotationally symmetric correction forms include, but are not limited to toric, sphero-cylindrical, sphero-cylindrical with higher order aberration correction. Toric includes the correction of both regular and irregular astigmatism.

The following is an exemplary design method pursuant to the present invention, obtained using averaged data from all of the considered semi-meridians. This approach will result in a rotationally symmetric design.

Method 1:
In the first method, pre and post orthokeratology maps are used as the starting point for the design. The pre orthokeratology map is subtracted from the post, and then the meridians are averaged. This will create the power profile shown in FIG. 5. This power profile is then applied to the base design of a lens for a myope requiring a −3.00 DS lens, to retard the advance of myopia. In method 1, the design power of the first annulus within the central optical zone was calculated mathematically as follows:

$$Power=0.486x^6-5.8447x^5+27.568x^4-65.028x^3+81.52x^2-51.447x+12.773$$

where x is the radial distance from the center of the lens.

The methods of the invention can be embodied as computer readable code on a computer readable medium. The computer readable medium is any data storage device that can store data, which thereafter can be read by a computer system. Examples of computer readable medium include read-only memory, random-access memory, CD-ROMs, DVDs, magnetic tape, optical data storage devices. The computer readable medium can also be distributed over network coupled computer systems so that the computer readable code is stored and executed in a distributed fashion.

The invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

Devices according to the invention may also be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will readily be able to combine the software created as described with appropriate general purpose or special purpose computer hardware to create a computer system or computer subsystem embodying the method of the invention.

The methods embodied in, for example, the computer instructions on computer readable media are used to produce the designs described above. The designs created according to one of the methods described above are used to produce lenses. Preferably, the lenses are contact lenses. Illustrative materials for formation of soft contact lenses include, without limitation, silicone elastomers, silicone-containing macromers including, without limitation, those disclosed in U.S. Pat. Nos. 5,371,147, 5,314,960, and 5,057,578 incorporated in their entireties by reference, hydrogels, silicone-containing hydrogels, and the like and combinations thereof. More preferably, the surface is a siloxane, or contains a siloxane functionality including, without limitation, polydimethyl siloxane macromers, methacryloxypropyl siloxanes, and mixtures thereof, silicone hydrogel or a hydrogel. Illustrative materials include, without limitation, acquafilcon, etafilcon, genfilcon, lenefilcon, senefilcon, balafilcon, lotrafilcon, galyfilcon or narafilcon.

Curing of the lens material may be carried out by any convenient method. For example, the material may be deposited within a mold and cured by thermal, irradiation, chemical, electromagnetic radiation curing and the like and combinations thereof. Preferably, molding is carried out using ultraviolet light or using the full spectrum of visible light. More specifically, the precise conditions suitable for curing the lens material will depend on the material selected and the lens to be formed. Suitable processes are disclosed in U.S. Pat. Nos. 4,495,313, 4,680,336, 4,889,664, 5,039,459, and 5,540,410 incorporated herein in their entireties by reference.

The contact lenses of the invention may be formed by any convenient method. One such method uses a lathe to produce mold inserts. The mold inserts in turn are used to form molds. Subsequently, a suitable lens material is placed between the molds followed by compression and curing of the resin to form the lenses of the invention. One ordinarily skilled in the art will recognize that any other number of known methods may be used to produce the lenses of the invention.

EXAMPLES

Example 1 (Prophetic)

In a longitudinal study comparing the axial length (eye growth) and auto-refraction of an age matched pediatric population of subjects aged 6 to 14 yrs old, contact lenses produced according to the method and design of the present invention are fitted to one group while a control group wears conventional contact lenses or spectacles. The first group receives lenses according to the following lens design and optical power profile described herein.

a) The optical power in the central disc of the optic zone is substantially constant;

b) the optical power in the first annulus at about a diameter of 4 mm increases in plus power to a range of +0.5 to +1.5 D, with a preferred value of about +1.0 D, at a diameter of 6.5 mm increases in plus power to a range +1.5 to +4.5 D, with a preferred value of about +3.4 D;

c) the optical power in the second annulus decreasing from the power found at the edge of the first annulus to a power between +1.5 and +4.5 D, with a preferred value of about +3.0 D;

d) the optical power of the third annulus being substantially constant at about the power found at the edge of the second annulus.

The lens powers in this example are described as follows:

a) The optical power in the central disc of the optic zone is substantially constant;

b) the optical power in the first annulus increases in plus power by a suitable polynomial equation of $4^{th}$ order or higher;

c) in a preferred aspect, the power change in the first annulus is governed by the equation:

$$\text{Power} = 0.486x^6 - 5.8447x^5 + 27.568x^4 - 65.028x^3 + 81.52x^2 - 51.447x + 12.773$$

where x is the radial distance from the center of the lens.

d) the optical power in the second annulus decreasing from the power found at the edge of the first annulus to a power between +1.5 and +4.5 D, with a preferred value of about +3.0 D;

e) the optical power of the third annulus being substantially constant at about the power found at the edge of the second annulus.

After six months to one (1) year of the study, the group wearing the lenses produced by the method and design according to this invention have a 60% to 80% reduced or a slower group average rate of eye growth than the group average eye growth rate of the control group as measured by the change (increase) in axial length or change (myopic shift) in auto-refraction over the same time period.

We claim:

1. An ophthalmic lens for the slowing of myopia progression comprising:

a) a convex surface with a central optic zone surrounded by a peripheral zone which is further surrounded by an edge zone, and a concave surface which rests on the wearer's eye;

b) the central optic zone including an inner disc, and a plurality of annuli, wherein a lens power at any location in the central optical zone is described by subtracting the optical power of a group of individual's eyes after orthokeratology treatment from the optical power of the group of individual's eyes before orthokeratology treatment, wherein the subtracting of the optical power of the group of individual's eyes after and before orthokeratology treatment is calculated by acquiring and averaging ocular wavefront data maps from a group of individual's eyes prior to orthokeratology treatment; converting the ocular wavefront data maps from the individual's eyes prior to orthokeratology treatment to a pre-treatment refractive power map by calculating the powers based on the radial slopes along the visual axis through the pupil centers of the individual's eyes; acquiring and averaging ocular wavefront data maps from the individual's eyes after orthokeratology treatment; converting the ocular wavefront data maps from the individual's eyes after orthokeratology treatment to a post treatment refractive power map by calculating the powers based on the radial slopes along the visual axis through the pupil centers of the individual's eyes; subtracting the pre-treatment refractive power map from the post treatment refractive power map to create a treatment map; averaging all of meridians of the treatment map to generate a rotationally symmetric power map; alternately averaging the individual meridians of the treatment map together to generate a non-rotationally symmetric power map; trimming the rotationally and non-rotationally symmetric power-maps to a diameter substantially corresponding to an optic zone of a contact lens; and forming the ophthalmic lens having the central optic zone with the power maps incorporated therein.

2. The ophthalmic lens of claim 1 wherein the inner disc has a diameter less than 2 mm.

3. The ophthalmic lens of claim 1 wherein the optical power of the inner disc is substantially constant.

4. The ophthalmic lens of claim 1 wherein the plurality of annuli comprises a first annulus having an outer diameter between 6.0 to 7.0 mm.

5. The ophthalmic lens of claim 1 wherein the plurality of annuli comprises a first annulus and wherein the optical power of the first annulus is described by the equation:

$$\text{Power}=0.486x^6-5.8447x^5+27.568x^4-65.028x^3+81.52x^2-51.447x+12.773$$

where x is the radial distance from the center of the lens.

6. The ophthalmic lens of claim 4, wherein the plurality of annuli comprises a second annulus surrounding the first annulus and has an outer diameter between 7.25 and 7.75 mm.

7. The ophthalmic lens of claim 6 wherein the optical power of the second annulus decreases smoothly from the power found at the edge of the first annulus smoothly to between +2.00 and +3.25 D.

8. The ophthalmic lens of claim 7, wherein the plurality of annuli comprises a third annulus surrounding the second annulus and has an outer diameter between 7.5 and 8.5 mm.

9. The ophthalmic lens of claim 8, wherein the plurality of annuli comprises a fourth annulus, the optical power of the fourth annulus is substantially constant with the power found at the edge of the second annulus.

10. The ophthalmic lens of claim 1 wherein the optical power of the eye data both after and before orthokeratology treatment is acquired from a total population.

11. The ophthalmic lens of claim 1 wherein the optical power of the eye data both after and before orthokeratology treatment is acquired from a sub-population.

12. The ophthalmic lens of claim 1 wherein the optical power of the eye data both after and before orthokeratology treatment is acquired from multiple corneal topography files.

13. The ophthalmic lens of claim 1 wherein the optical power of the eye data both after and before orthokeratology treatment is acquired from an average of multiple wavefront files.

14. The ophthalmic lens of claim 1 wherein the lens power at any location in the optical zone is calculated by averaging all meridians to a rotationally symmetric form.

15. The ophthalmic lens of claim 1 wherein the lens power at any location in the optical zone is calculated by averaging individual meridians to a non-rotationally symmetric form.

* * * * *